United States Patent [19]
Block et al.

[11] 4,313,923
[45] Feb. 2, 1982

[54] METHOD OF PRODUCING PSEUDOBOEHMITES

[75] Inventors: Thomas E. Block, Long Beach; Julius Scherzer, Anaheim, both of Calif.

[73] Assignee: Filtrol Corporation, Los Angeles, Calif.

[21] Appl. No.: 220,904

[22] Filed: Dec. 29, 1980

[51] Int. Cl.$^3$ .............................................. C01F 7/34
[52] U.S. Cl. .................................. 423/628; 423/625; 423/631
[58] Field of Search ............... 423/625, 628, 629, 631; 252/317

[56] References Cited

U.S. PATENT DOCUMENTS

| | | | |
|---|---|---|---|
| 2,988,520 | 6/1961 | Braithwaite | 423/628 |
| 3,380,933 | 4/1968 | Michel et al. | 423/628 |
| 3,864,461 | 2/1975 | Miller et al. | 423/628 |
| 4,154,812 | 5/1979 | Sanchez et al. | 423/628 |

FOREIGN PATENT DOCUMENTS 888772  2/1962  United Kingdom ............... 423/628

Primary Examiner—Herbert T. Carter
Attorney, Agent, or Firm—Philip Subkow; Bernard Kriegel

[57] ABSTRACT

Method of producing pseudoboehmite by reacting an aluminum salt with an aluminate.

6 Claims, No Drawings

METHOD OF PRODUCING PSEUDOBOEHMITES

BACKGROUND OF THE INVENTION

This invention relates to aluminas of the pseudoboehmite type which are suitable for incorporation into catalysts composed of Y zeolites and a matrix containing clay and such aluminas.

The aluminas which have been employed are selected to produce zeolite catalysts which have suitable resistance to attrition. The problem has been addressed and discussed in Secor et al. U.S. Pat. No. 4,010,116, Lim, et al., U.S. Pat. No. 4,206,085, and in copending applications of which one of us is a co-applicant in applications Serial No. 138,544, and Serial No. 173,064.

The pseudoboehmite aluminas which when employed in the zeolite-clay-alumina systems which have been found most suitable to produce catalysts having a desirable attrition resistance have been designated as Type A aluminas (See Lim et al., supra, U.S. Pat. No. 4,206,085). Such aluminas are also identified in said Liu, et al. applications as those having a Peptization Index of less than 60, and preferably less than about 30. (See Appendix.)

In the copending applications, procedures are described for producing pseudoboehmites having suitable peptization index values for use in zeolite-clay-alumina catalyst systems, based on the neutralization of an acid aluminum salt with ammonium hydroxide.

STATEMENT OF THE INVENTION

We have found that pseudoboehmites of properties which make them suitable for incorporation as a component of a clay containing matrix for a zeolite containing catalyst, to produce desirable attrition resistant spray dried microsphere of the catalyst, may be produced from the reaction between an acid salt of aluminum and an aluminate salt.

We have found that provided the reaction, and the drying conditions are controlled, we may produce a pseudoboehmite which may be incorporated to form a zeolite-clay-alumina catalyst in the form of a spray dried microsphere of desirable attrition.

The pseudoboehmites of our invention are characterized in that they have both a Peptization Index of less than 60 and preferably less than 30 and also a Type No. of less than about 0.32. (For the procedure to determine the Peptization Index and Type No, see Appendix to this specification.)

The aluminas of our invention are produced by reaction between a water solution of cationic aluminum ion, i.e. a solution of an acid salt of aluminum, for example, $Al(NO_3)_3$, $AlCl_3$ and $Al_2(SO_4)_3$ with an anionic aluminum, i.e., an aluminate, for example, sodium aluminate.

The preferred conditions of the reaction, aging and drying which we have found desirable to produce the pseudoboehmites of our invention, may be summarized, as follows:

A. Reaction Conditions

While we may employ either $Al(NO_3)_3$, $AlCl_3$ or $Al_2(SO_4)_3$ as the source of the cationic alumina, we prefer to employ $Al_2(SO_4)_3$ and to use sodium aluminate as the anionic alumina source to produce the alumina hydrate gel. The following conditions have been found suitable for the production of a pseudoboehmite from sodium aluminate and aluminum sulfate. The two may be mixed by adding them to a vessel simultaneously, or the sulfate may be added to the aluminate or vice-versa. We prefer to use the method in which the aluminate is added to the sulfate.

1. The ratio of reactants are adjusted so that a terminal pH, that is when all the reactants have been combined, is desirably in a range of not less than 9.0 and up to about 10.5, with a pH of 10 preferred.

2. The temperature during mixing is preferably maintained in the range of about 65° C. to about 80° C.

3. The concentration of the resultant alumina hydrate mother liquor slurry is held within the range of more than about 2% to not more than about 7% by weight of the reactant solution (calculated as the equivalent anhydrous $Al_2O_3$ volatile free).

B. Aging Conditions

1. The alumina gel which is formed as a result of the reaction steps of A above is aged in the presence of the aqueous mother liquor at the terminal pH as stated above. The aging is under quiescent conditions, that is without substantial agitation. The time of aging in hours being the lessor, the higher the temperature. The temperature during aging is preferably in the range of about 60° C. to about 80° C. for a period of time from about 20 hours at 80° C. to about 60 hours at 60° C. The gel formed in Steps A crystallizes into crystalline pseudoboehmite. (For the crystallographic composition of pseudoboehmite, see Secor, et al., supra.)

2. The crystallized pseudoboehmite is separated from the mother liquor as by filtration and the separated pseudoboehmite is washed. Where the separation is by filtration, the filter cake is washed through the filter cake or by repeated reslurrying of the filter cake in wash water and refiltering. It is desirable that the equivalent sulfate content remaining in the pseudoboehmite from the acid salt be reduced to less than about 1% by weight expressed as the equivalent $SO_3$ of the washed alumina on a volatile free basis.

C. Drying

1. The washed pseudoboehmite may be dried under quiescent conditions or in a spray dryer. The washed filter cake is dried under quiescent conditions. Such conditions may be established by spreading the wet alumina cake on a surface such as a tray or moving belt or other apparatus and maintaining the wet cake at a temperature of about 100° C. to about 110° C. for a time sufficient to develop a dried product containing water in the range of about 20% to 40% by weight. The time at the above temperatures and at the above quiescent conditions preferably should not exceed about 6 hours.

2. Instead of drying by the above procedures, the wet filter cake may be spray dried. The washed filter cake is reslurried to about 16–17% by weight $Al_2O_3$ (volatile free basis) in water. It is spray dried at the minimum temperatures necessary to dry the product to the range of 20–40% by weight water content, by feeding finely divided droplets of slurry into a combustion stream. The best mode presently known to applicants of such a minimum temperature is a stream having an initial temperature of about 700° F. and a discharge temperature of about 250° F.

D. Use of Wet Filter Cake

The washed alumina formed of Step B according to our invention if it is not dried as in Step C may be used in the wet washed condition to produce catalysts of good attrition index if they are comminuted as in the case of the Type B aluminas as described in said Lim, et al. patent. The slurry of the wet cake is milled, for example, in a colloid mill, until the temperature of the slurry is raised to about 10° to 20° F., for example 15° F. We may, for example, use a mixture of good quality alumina (e.g. Type A alumina) with alumina formed according to our invention, in which mixture our alumina (formed according to our invention) represents 40% by weight on a volatile free basis for incorporation in a catalyst formation such as described above which has desirable resistance to attrition, for example of about 20 Attrition Index. (See Lim, et al., U.S. Pat. No. 4,206,085, supra, and Secor, et al., U.S. Pat. No. 4,086,187).

Example 1 illustrates the best mode and our presently preferred procedure for producing the pseudoboehmite of our invention.

EXAMPLE 1

Sodium aluminate solution is added slowly to the aluminum sulfate solution until the pH of the reaction slurry reaches 10. The reaction is carried out in a vessel maintained at 60°–80° C. and with sufficient stirring to avoid local concentrations of the aluminate solution in the resulting gel mother liquor slurry. The slurry is agitated for another 10 to 15 minutes after the pH has stabilized at 9.5 to 10.5 after the addition of the aluminate addition.

The alumina gel is "aged" in the slurry at about 60° to about 80° with no agitation for about 20 to about 60 hours. The alumina product is then filtered and washed with deionized water until the sulfate content is below 1% in the filter cake on a volatile free basis.

The filter cake is broken up and dried at about 100° to about 110° C. for about 4 hours but no longer than 6 hours.

The above procedure may be used to produce dried pseudoboehmites which have peptization Indices of less than 60 minutes and Type Nos. less than 0.32.

The pseudoboehmite produced as in Example 1 was mixed in a water slurry at a ratio of 16% alumina with 63.5% ball clay and 7% of a Y zeolite of about 4.75 $SiO_2/Al_2O_3$ molar ratio. The Y zeolite had been exchanged with ammonium sulfate to reduce the initial sodium content to about 3.5% by weight expressed as the equivalent $Na_2O$ and based in the zeolite on a volatile free basis. In addition, there was added to the mixture 11% of the above Y zeolite which has been exchanged with ammonium sulfate and rare earth salts to reduce the sodium to less than about 2% expressed as the equivalent $Na_2O$ (based on the zeolite on a volatile free basis) and ammonium polysilicate (See Lim, et al., U.S. Pat. No. 4,086,187) in amount equivalent to about 2.5% by weight of the equivalent $SiO_2$. All percentages except as above stated were based on the composite catalyst on a volatile free basis. The components were mixed and spray dried to produce particles such as are termed microspheres of about 50 to about 70 microns average diameter.

The following examples illustrate the effect of the various reaction and drying parameters on the properties of the resultant pseudoboehmite. Those skilled in the art will know from the disclosure herein, how to adjust the parameters of reaction to obtain the effective reaction and drying conditions for other aluminum salts and aluminates to produce the pseudoboehmites of our invention.

The following Example 2 illustrates the effect of the pH on production of an alumina gel which may be crystallized into a pseudoboehmite of suitable type number and peptization index to form a useful addition to the zeolite-clay-alumina systems. The following data illustrate that at a pH of below about 9.5, the alumina gel was not only resistant to removal of sulphates from the alumina gel by washing, but also resulted in a crystallized pseudoboehmite of unsuitable Type No. and Peptization Index. Without wishing to be bound by any theory of the cause for these observed facts, we note that the isoelectric points for alumina gels is in the region of 9.4 pH below which pH the alumina is positively charged and retains negative ions.

EXAMPLE 2

Sodium aluminate solution of composition 14% $Al_2O_3$ and 12% $Na_2O$ and aluminum sulfate solution of 7% $Al_2O_3$ were added slowly and simultaneously to water at such rates to maintain a reaction pH of 7.5. The reaction is carried out in a vessel maintained at 65° C. and with sufficient stirring to avoid local concentrations of either component. When the desired $Al_2O_3$ concentration is reached, the flow of aluminum sulfate is stopped and the sodium aluminate is continued until the terminal pH shown in Table 1 is reached. The slurry is agitated for another 10 to 15 minutes after the pH has stabilized at the terminal pH.

The alumina gel is aged in the slurry as shown in Table 1 at 65° C. for 70 hours. The alumina product is filtered and washed with deionized water until the filtrate shows no sign of sulfate. The resultant cake is broken up and dried at about 100° to 110° C. for about 4 hours.

TABLE 1

| Sample | Slurry Conc. as % $Al_2O_3$ | pH at Start of Aging | pH at End of Aging | $SO_3$ | PB Type | Cryst. Size Å | PI/min |
|---|---|---|---|---|---|---|---|
| 1 | 7.1 | 8.1 | 7.3 | 5.7 | 0.50 | 21 | >60 |
| 2 | 7.1 | 9.0 | 9.3 | Nil | 0.23 | 28 | >60 |
| 3 | 7.1 | 10.1 | 10.8 | Nil | 0.24 | 28 | 75 |
| 4 | 5.0 | 8.0 | 5.8 | 11.4 | 1.55 | — | >60 |
| 5 | 5.0 | 9.0 | 8.8 | 1.57 | 0.23 | 22 | >60 |
| 6 | 5.0 | 10.1 | 9.8 | Nil | 0.21 | 36 | 9 |

EXAMPLE 3

This example illustrates the effect of temperature of the reaction and the temperature of aging on the nature of the pseudoboehmites.

The temperature of the reaction at which the gel is formed affects the temperature at which the aging should be conducted in order to obtain a pseudoboehmite which may be crystallized within practical period of times to produce pseudoboehmites of the desirable type number and peptization index. As appears from the data tabulated in Table 2, the best results were obtained where the reaction temperature and the aging temperature were both above about 50° C.

In this Example 3, the procedure of Example 1 was followed but the temperature of mixing and the temperature of aging were altered. The time of aging was 66 hours. The significant data are tabulated in Table 2.

TABLE 2

| Sample | Temperatures/°C. Reaction | Temperatures/°C. Aging | PB Type | PI/min |
|---|---|---|---|---|
| 1 | 54 | 44 | 0.28 | >60 |

TABLE 2-continued

| Sample | Temperatures/°C. Reaction | Aging | PB Type | PI/min |
|---|---|---|---|---|
| 2 | 57 | 65 | 0.27 | 167 |
| 3 | 64 | 44 | 0.30 | 47 |
| 4 | 64 | 58 | 0.25 | 16 |
| 5 | 64 | 84 | 0.27 | 16 |
| 6 | 80 | 84 | 0.19 | >60 |

For aging times of 60 hours, the optimum temperature for reaction and also aging is about 60° C. (See Samples 2-5.)

The above data when compared with the data of Table 1 illustrates the advantage of the procedure of Example 1 as compared with that of Example 2 (compare the PI).

EXAMPLE 4

This example illustrates the effect of the concentration of the alumina gel in the mother liquor, expressed as the equivalent anhydrous $Al_2O_3$ on the properties of the resultant crystallized pseudoboehmite.

The procedure of Example 1 was followed. The reactants were combined at 65° C. and gels aged between 48 and 70 hours at 62° C. and tray dried 4 hours. The concentration of the reactants were adjusted to result in a slurry of gel having concentrations as shown in Table 3 by weight of said $Al_2O_3$. The reactants were combined at 65° C. and the gels aged between 48 and 70 hours at 62° C. The results obtained are shown in Table 3.

TABLE 3

| Sample | Slurry Conc./% $Al_2O_3$ | Aging Time Hours | PB Type | PI/min. |
|---|---|---|---|---|
| 1 | 2.3 | 65 | 0.19 | 24 |
| 2 | 4.2 | 65 | 0.20 | 4 |
| 3 | 5.0 | 65 | 0.20 | 8 |
| 4 | 5.8 | 48 | 0.21 | 21 |
| 5 | 6.0 | 65 | 0.22 | 29 |
| 6 | 7.2 | 48 | 0.25 | 24 |
| 7 | 7.6 | 65 | 0.25 | >60 |
| 8 | 10.8 | 65 | 0.28 | >60 |

EXAMPLE 5

This example illustrates the effect of time of aging on the properties of the pseudoboehmites.

As is shown in the Table 4, below, the type number of the pseudoboehmite decreased with time of aging. At 65° C., reaction and aging temperature, the type number decreased rapidly to about 0.3 in approximately 18 hours and then more slowly to between 0.15 and 0.30 in 2 to 4 days depending on other parameters, at 80° C. reaction and aging temperature, the type number begins at about 0.3 and decreases to less than 0.2 in about 20 hours.

The conditions described in Example 1 were followed except that the temperature and time of aging were adjusted as appears in Table 4.

TABLE 4

| Sample | Slurry conc./% $Al_2O_3$ | Aging Time/Hr | PB Type | PI/min |
|---|---|---|---|---|
| Reacted and aged at 65° C.: | | | | |
| 1 | 5 | 20 | 0.33 | 128 |
| 2 | 6 | 23 | 0.27 | 62 |
| 3 | 7.5 | 40 | 0.33 | 158 |
| 4 | 6 | 45 | 0.24 | 29 |
| 5 | 7.6 | 45 | 0.30 | 1 |
| 6 | 5.8 | 48 | 0.21 | 21 |
| 7 | 7.1 | 64 | 0.31 | 5 |
| 8 | 6 | 66 | 0.22 | 29 |
| 9 | 7.6 | 69 | 0.25 | >60 |
| 10 | 7.7 | 91 | 0.19 | >60 |
| Reacted and aged at 80° C.: | | | | |
| 11 | 5.0 | 0.1 | 0.32 | >60 |
| 12 | 7 | 0.4 | 0.31 | >60 |
| 13 | 5 | 4 | 0.29 | >60 |
| 14 | 7 | 5.3 | 0.29 | >60 |
| 15 | 5 | 20 | 0.22 | 11 |
| 16 | 7 | 22 | 0.17 | 69 |
| 17 | 7 | 29 | 0.18 | 43 |

We have found that up to 6 hours of drying time is a suitable duration for drying under quiescent conditions. Drying for substantially longer periods of time produced pseudoboehmites which are unsuitable according to the above criteria.

Insufficient drying results in a product which is too wet to be pulverized by mechanical equipment. However, drying for a time as low a 2 or 3 hours did produce a product which may be comminuted to produce a pseudoboehmite which may be incorporated to form zeolite-clay-alumina catalyst of attrition index of less than about 20.

The best mode presently known to use is illustrated by Samples 2-4 of Table 3 and Sample 15 of Table 4. For example, the procedure illustrated by these examples produced catalysts of the formulation described in connection with Example 1 which had 5 hour Attrition Index of under 20 (see Secor, et al., U.S. Pat. No. 4,010,116). The micro activity (see Appendix) of the above Samples were in the range of about 71 to 75 M and about 24 to 33 S+.

APPENDIX

Peptization Index

The test develops a Peptization Index (PI) as the time in minutes required for a pseudoboehmite peptized by formic acid to develop a Brookfield Viscosity of 5000 centipoises.

14.9 grams of the pseudoboehmite (on a volatile free basis) is dispersed in sufficient water at 27° C. to weigh 145 grams. To this water slurry is added 1.4 grams of 90% formic acid and the slurry is stirred until the vortex disappears. The slurry is then introduced promptly into a Brookfield viscosimeter and the interval of time measured until the viscosity reaches 5000 centipoises. Time is measured from the moment formic acid is added to the slurry.

The Peptization Index of the test alumina hydrate is the number of minutes required to reach the above viscosity.

Micro-activity Test

A test oil (ASTM Subcommittee D-32, Standard FHC 893) is vaporized and passed through a bed of microspheres produced by spray drying of the catalyst. Spray dried microspheres of the catalyst are of a particle size within the range of 50-70 microns.

The catalyst charge is 4.00±0.05 grams and 1.33±0.03 grams of oil is passed through the catalyst bed over a period of 75 seconds. The catalyst is prepared by heating a shallow bed of the catalyst for three (3) hours in air at 1050° F. and then steamed for two (2) hours at 1450° F. and another sample is steamed at 1500° F. for two (2) hours and another sample is steamed at 1550° F. for two (2) hours. The oil passed through a preheat zone and through a bed of the microspheres maintained at a temperate of 900°±2° F. at a weight hourly space velocity (WHSV) of 16.

The vapors and gases passing from the bed are condensed in an ice bath and the uncondensed gases collected over water.

The following observations are made. The weight of the condensate and the volume and temperature of the gases are determined. The liquid condensate fraction is analyzed and the percent by weight of the liquid fraction which is boiled above 421° F. is determined. The volume and temperature of the gases collected over the water are measured and the volume reduced to standard conditions. The uncondensed gases are analyzed and the weight percent of the gases which is hydrogen, isopentane, and hexanes is determined and their weight percent of the feed determined. The weight percent of the liquid charge is determined from the following relation:

F is the weight of the oil passing through the reactor;

L is the weight of the liquid product which is collected as condensate;

R is the percent by weight of the fraction of the liquid condensate which boils above 421° F.;

H is the grams of liquid held up in the reactor exit line and around the reactor, receiver and joints.

In the above test it has been determined that it constitutes three percent of the feed F. The weight percent conversion (%C) is given by the following relationship.

$$\% C = \frac{F - \frac{R \times L}{100} - H}{F} \times 100$$

The conversion using the catalyst steamed at 1450° F. is termed M conversion, the one steamed at 1500° F. is termed S conversion, and the one steamed at 1550° F. is termed S+ conversion.

Type Number

The following describes in detail the method and procedures to be followed in determining pseudoboehmite type numbers.

Sample Preparation:
  Wet—dry sample (∼2 volatile free grams) in microwave oven for 20 minutes, then grind with mortar and pestle until fine powder, pack it into a specimen holder, and mount it in the x-ray unit.
  Dry—if sample (∼2 volatile free gram) does not stick during grinding operation (vide supra) use as is: if sample sticks, then dry for 10 minutes in microwave oven, grind, pack it into a specimen holder, and mount it in the x-ray unit.

XRD Machine Settings:
  Copper K-alpha radiation, 35 KV—20 MA, Receiving slit—0.006, Scatter and divergence slits —1°, Ni filter (PHA: Baseline 250, Window 300)

XRD Run Conditions:
  Scan—2° to 28° $2\theta$, Scanning speed —1°/min., Chart Speed—15 in/hr., Time Constant—10 seconds, Full scale—500 c/sec.

Calculation of Pseudoboehmite Type Number:
  Measure height of valley minimum at 9° ($2\theta$) relative to background at 21° ($2\theta$), Measure height of peak summit at 13° ($2\theta$) relative to background at 21° ($2\theta$)

Type Number = $\frac{\text{Valley Minimum (9° } 2\theta) - \text{Background (21° } 2\theta)}{\text{Peak Summit (13° } 2\theta) - \text{Background (21° } 2\theta)}$,

We claim:

1. The method of producing pseudoboehmite having a Peptization Index of less than about 60 and a Type No. of less than about 0.32, which comprises mixing a source of anionic aluminum with a source of cationic aluminum at a ratio to produce a pH in the range of about 9 to about 10.5 and at a temperature in the range of about 65° C. to about 80° C. to produce a mother liquor slurry containing alumina hydrate of more than about 2% to about 7% by weight of the reactant solution (calculated as the equivalent anhydrous alumina), aging the mother liquor at a temperature in the range of about 60° C. to about 80° C. for a time ranging from about twenty (20) hours at 80° C. to about sixty (60) hours at 60° C., separating the alumina hydrate from the mother liquor.

2. The method of producing pseudoboehmite having a Peptization Index of less than about 60 and a Type No. of less than about 0.32, which comprises mixing a source of anionic aluminum with a source of cationic aluminum at a ratio to produce a pH in the range of about 9 to about 10.5 and at a temperature in the range of about 65° C. to about 80° C. to produce a mother liquor slurry containing alumina hydrate of more than about 2% to about 7% by weight of the reactant solution (calculated as the equivalent anhydrous alumina), aging the mother liquor at a temperature in the range of about 60° C. to about 80° C. for a time ranging from about twenty (20) hours at 80° C. to about sixty (60) hours at 60° C., separating the alumina hydrate from the mother liquor, and drying said alumina under quiescent conditions.

3. The method of producing pseudoboehmite having a Peptization Index of less than about 60 and a Type No. of less than about 0.32, which comprises mixing a source of anionic aluminum with a source of cationic aluminum at a rtio to produce a pH in the range of about 9 to about 10.5 and at a temperature in the range of about 65° C. to about 80° C. to produce a mother liquor slurry containing alumina hydrate of more than about 2% to about 7% by weight of the reactant solution (calculated as the equivalent anhydrous alumina), aging the mother liquor at a temperature in the range of about 60° C. to about 80° C. for a time ranging from about twenty (20) hours at 80° C. to about sixty (60) hours at 60° C., separating the alumina hydrate from the mother liquor, slurrying said separated alumina hydrate in water and spray drying said slurry at a temperature to dry said alumina hydrate to a water content in the range of 20 to 40 percent.

4. The method of producing pseudoboehmite having a Peptization Index of less than about 60 and a Type No. of less than about 0.32, which comprises mixing a source of anionic aluminum with a source of cationic aluminum at a ratio to produce a pH in the range of about 9 to about 10.5 and at a temperature in the range of about 65° C. to about 80° C. to produce a mother liquor slurry containing alumina hydrate of more than about 2% to about 7% by weight of the reactant solution (calculated as the equivalent anhydrous alumina), aging the mother liquor at a temperature in the range of about 60° C. to about 80° C. for a time ranging from about twenty (20) hours at 80° C. to about sixty (60) hours at 60° C., separating the alumina hydrate from the mother liquor, slurrying said alumina hydrate in water and spray drying said alumina hydrate at a temperature of about 700° F. and a discharge temperature of not more than about 250° F.

5. The process of claims 1, 2, 3 or 4, in which the anionic aluminum source is added to the cationic source.

6. The process of claims 1, 2, 3 or 4, in which the cationic aluminum source is added to the anionic source.

* * * * *